United States Patent [19]
Ramsey et al.

[11] 3,919,169
[45] Nov. 11, 1975

[54] CONTINUOUS PROCESS FOR THE PRODUCTION OF SOLID EPOXY RESINS

[75] Inventors: David W. Ramsey, Houston; Charles H. Jayroe, Lake Jackson, both of Tex.

[73] Assignee: The Dow Chemical Company, Midland, Mich.

[22] Filed: Feb. 20, 1974

[21] Appl. No.: 444,087

[52] U.S. Cl. .................... 260/47 EP; 260/49
[51] Int. Cl.² ............................ C08G 30/04
[58] Field of Search .......... 260/47 EP, 613 B, 95 C Primary Examiner—Melvin Goldstein
Assistant Examiner—T. Pertilla
Attorney, Agent, or Firm—James G. Carter

[57] ABSTRACT

Solid epoxy resins are produced continuously by passing a mixture of liquid epoxy resin, bisphenol and catalyst through a preheat zone, a reaction zone and a postheat zone at a positive backpressure.

3 Claims, No Drawings

CONTINUOUS PROCESS FOR THE PRODUCTION OF SOLID EPOXY RESINS

The present invention relates to a process for the preparation of solid epoxy resins.

Solid epoxy resins of the polyglycidyl ether type have usually been prepared by batch processes wherein

and

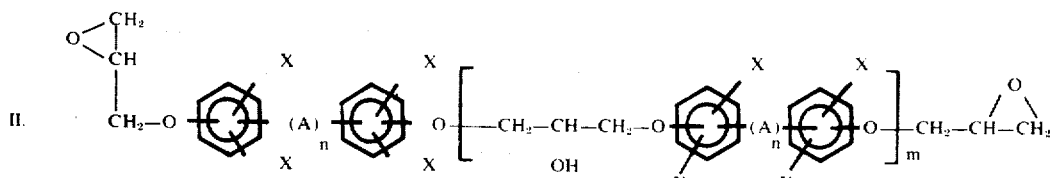

1. a bisphenol is reacted with an epihalohydrin in the presence of a suitable catalyst and the reaction product subsequently dehydrohalogenated to produce the epoxy resin, or
2. a liquid epoxy resin is reacted with a bisphenol in the presence of a suitable catalyst to produce the desired solid epoxy resin.

It has now been discovered that solid epoxy resins can be produced continuously by passing a mixture of
1. a liquid epoxy resin;
2. a bisphenol or other suitable compound having about 2 aromatic hydroxyl groups and
3. a suitable catalyst for effecting reaction between the 1,2-epoxy groups of the epoxy resin with the hydroxyl groups of the bisphenol through a preheat zone wherein the mixture is heated to a temperature close to but below the reaction temperature, i.e. less than about 130°C, preferably between about 115° to about 125°C.

The thus preheated mixture is then passed through a reaction zone wherein the temperature is controlled so as to maintain the mixture at a temperature between about 130° to about 250°C, preferably about 130° to about 160°C. The mixture is then passed through a post heat zone wherein the mixture is maintained at a temperature between 130° and about 250°C, preferably between about 160° and about 180°C.

The flow rate is adjusted such that the time in the reactor zone is such that the mixture has passed through its exotherm. The time in the post heat zone is such that the reaction is substantially complete.

The process is conducted under a positive backpressure sufficient to eliminate surging of the reactant mixture in each zone of the process. This back pressure varies depending upon the particular reactant mixture being employed, but is usually within the range of from about 1 psig (0.07 kg/cm$^2$) to about 300 psig (21.09 kg/cm$^2$), preferably from about 10 psig (0.70 kg/cm$^2$) to about 100 psig (7.03 kg/cm$^2$) and most preferably from about 20 psig (1.41 kg/cm$^2$) to about 40 psig (2.81 kg/cm$^2$).

After the solid epoxy resin has been prepared by the process of the present invention, it is then processed in the conventional manner for ultimate use i.e. it is filtered and then flaked or diluted with suitable solvents to prepare solution resins useful as coatings and the like.

Suitable liquid epoxy resins which may be suitably employed in the process of the present invention include the glycidyl ethers of aromatic dihydroxyl-containing compounds such as those represented by the formulas wherein A is a divalent hydrocarbon radical having from about 1 to about 10 carbon atoms, —S—, —S—S—,

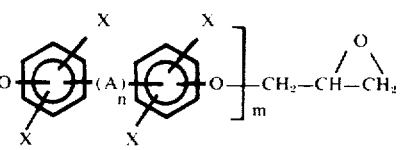

or —O—; each X is independently hydrogen, chlorine or bromine, n is zero or 1 and m has a value such that the glycidyl ether is a liquid, i.e. pourable even though highly viscous, at about atmospheric pressure and 60°C. These liquid epoxy resins have an average of more than 1 glycidyl ether group per molecule, but not greater than an average of about 2 such groups per molecule. Suitable aromatic hydroxyl-containing compounds hereinafter referred to as dihydric phenols which may be employed in the process of the present invention include those represented by the formulas

III.

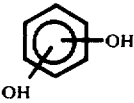

and

IV.

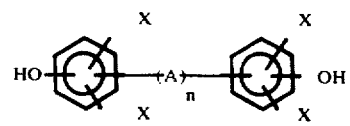

wherein A, X and n are as defined in formula II above.

The molar ratio of liquid epoxy resin to aromatic hydroxyl-containing compound is dependent upon the starting liquid epoxy resin and the epoxide equivalent weight or % epoxide desired in the resulting solid epoxy resin. Those skilled in the art are familiar with the particular ratios of the reactants required to produce a solid epoxy resin possessing the desired epoxide equivalent weight or % epoxide.

Suitable catalysts are any catalyst which catalyzes the reaction between a vicinal epoxy group and a phenolic hydroxyl group. Such catalysts include, for example, organic ammonium compounds such as benzyltrimethylammonium chloride, organic phosphines such as triphenylphosphine and organic phosphonium compounds such as ethyltriphenyl phosphonium iodide, ethyl triphenyl phosphonium acetate.acetic acid complex. Such catalysts are well known in the art and are disclosed in *Handbook of Epoxy Resins* by Lee and Neville, McGraw Hill Book Co., 1967, U.S. Pat. No. 3,341,580; U.S. Pat. No. 3,477,990; U.S. Pat. No. 3,547,881; and Canadian Pat. No. 893,191.

EXAMPLE 1

A liquid diglycidyl ether of bisphenol-A (D.E.R. 331) having an epoxide equivalent weight of 182–190 and bisphenol-A were fed into a Kenics static mixer. The liquid epoxy resin was fed at a temperature of 80°C at a rate of 228 lbs/hour (103.42 kg) and the bisphenol-A was fed at 160°C at a rate of 72 lbs. (32.66 kg) per hour. This mixture was then fed into an agitated continuous mixer where it was admixed with a 25% methanol solution of ethyltriphenyl phosphonium acetate.acetic acid complex at a rate of 38 grams of solution per hour. The resultant catalyzed mixture was then fed into a 20 ft. long, 2 inch ID jacketed preheat zone wherein the mixture was heated to a temperature of 120°C. The thus heated mixture was then fed into a 150 ft. long, 2 inch I.D. jacketed reaction zone wherein the temperature was maintained at 150°–160°C. The resultant partially reacted product which had passed through its exotherm period was then fed into a jacketed 170 ft. long 2 inch ID post-heat zone wherein the mixture was maintained at a temperature of 160°–180°C wherein the reaction was completed and subsequently flaked. The above system was maintained at a backpressure of 20 psig (1.41 kg/cm²) so as to prevent surging. The resultant solid product had a % epoxide of 8.38 (EEW = 518), a viscosity at 150°C of 470 centistokes and a phenolic hydroxyl content of 0.034%.

EXAMPLE 2

The process of Example 1 was repeated employing the following reactants and catalyst.
221 lbs (100.25 kg)/hr of D.E.R. 331
87 lbs (39.46 kg)/hr of bisphenol-A
38 g/hour of a 25% methanol solution of ethyltriphenyl phosphonium acetate.acetic acid catalyst solution.

The resultant product was characterized as follows:
% epoxide = 6.35 (EEW - 677)
viscosity at 150°C = 1524 centistokes
% Phenolic OH = 0.012

EXAMPLE 3

The process of Example 1 was repeated employing the following reactants and catalyst.
213 lbs (96.62 kg)/hr of D.E.R. 331
87 lbs (39.46 kg)/hr of bisphenol-A
50 g/hr of a 25% methanol solution of ethyltriphenyl phosphonium acetate.acetic acid catalyst solution.

The resultant product was characterized as follows:
% epoxide = 5.6 (EEW = 767)
viscosity at 150°C = 3166 centistokes
% phenolic OH = 0.014.

EXAMPLE 4

The process of Example 1 was repeated employing the following reactants and catalyst.
210 lbs (95.26 kg)/hr of D.E.R. 331
90 lbs (40.82 kg)/hr of bisphenol-A
50 g/hr of a 25% methanol solution of ethyltriphenyl phosphonium acetate.acetic acid complex catalyst.

The resultant product had the following characteristics:
% epoxide = 4.89 (EEW = 879)
Viscosity at 150°C = 8347 centistokes
% phenolic OH = 0.069.

We claim:

1. A process for the continuous production of solid epoxy resins which comprises passing a reaction mixture comprising a liquid aromatic epoxy resin containing 62-epoxy groups, a dihydric phenol and a catalyst for effecting a reaction between said liquid epoxy resin and dihydric phenol through
   first, a preheat zone wherein the reaction mixture is heated to a temperature below the reaction temperature of said mixture;
   second, a reaction zone wherein the reaction mixture is maintained at a temperature between about 130° to about 250°C; and
   third, a post-heat zone wherein the temperature is maintained at a temperature between about 130° to about 250°C,
while maintaining a positive backpressure in each of said first, second and third zones; and subsequently recovering the resultant solid epoxy resin.

2. The process of claim 1 wherein the temperature of the reaction mixture in said preheat zone is from about 115° to about 125°C, the temperature of the reaction mixture in said reactions zone is from about 130° to about 160°C and the temperature of the reaction mixture in said post-heat zone is from about 160° to about 180°C and the backpressure is from about 20 to about 40 psig (1.41 to 2.81 kg/cm²).

3. The process of claim 2 wherein said liquid epoxy resin is a diglycidyl ether of bisphenol-A and said dihydric phenol is bisphenol-A.

* * * * *

UNITED STATES PATENT OFFICE
CERTIFICATE OF CORRECTION

PATENT NO. : 3,919,169
DATED : Nov. 11, 1975
INVENTOR(S) : David W. Ramsey, et al.

It is certified that error appears in the above-identified patent and that said Letters Patent are hereby corrected as shown below:

Col. 1 and Col. 2, formula, between brackets please add a bond from "CH" to "OH".

Col. 4, line 25, please delete "62-" and add --1,2- --.

Col. 4, line 43, change "reactions" to --reaction--.

Signed and Sealed this

Twenty-first Day of September 1976

[SEAL]

Attest:

RUTH C. MASON
Attesting Officer

C. MARSHALL DANN
Commissioner of Patents and Trademarks